(12) United States Patent
Park et al.

(10) Patent No.: US 11,156,994 B2
(45) Date of Patent: Oct. 26, 2021

(54) AUTOMATED GUIDED VEHICLE CONTROL SYSTEM AND METHOD THEREOF

(71) Applicants: HYUNDAI MOTOR COMPANY, Seoul (KR); KIA MOTORS CORPORATION, Seoul (KR)

(72) Inventors: Kyung Dong Park, Hwaseong-si (KR); Young Jin Jung, Cheonan-si (KR); Sang Won Yoon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 258 days.

(21) Appl. No.: 16/433,265

(22) Filed: Jun. 6, 2019

(65) Prior Publication Data
US 2020/0183371 A1 Jun. 11, 2020

(30) Foreign Application Priority Data
Dec. 7, 2018 (KR) .................. 10-2018-0157504

(51) Int. Cl.
*G05B 19/418* (2006.01)
*G05D 1/02* (2020.01)
*G05D 1/00* (2006.01)

(52) U.S. Cl.
CPC ..... *G05B 19/41895* (2013.01); *G05D 1/0229* (2013.01); *G05D 2201/0216* (2013.01)

(58) Field of Classification Search
CPC .......... G05B 19/41895; G05D 1/0263; G05D 1/0261; G05D 1/0229; G05D 2201/0216; G05D 1/0016; G05D 1/0044; G05D 1/02; G06F 3/048; B25J 5/02
See application file for complete search history.

(56) References Cited

U.S. PATENT DOCUMENTS

| 2015/0251715 | A1* | 9/2015 | Hutson | B60K 17/356 701/22 |
|---|---|---|---|---|
| 2018/0275680 | A1* | 9/2018 | Gupta | B66F 9/063 |
| 2019/0187699 | A1* | 6/2019 | Salour | G05D 1/0033 |
| 2019/0361461 | A1* | 11/2019 | Kobayashi | G05D 1/0229 |
| 2020/0012284 | A1* | 1/2020 | Morita | G01C 21/206 |

(Continued)

FOREIGN PATENT DOCUMENTS

| JP | H07314267 A | 12/1995 | |
|---|---|---|---|
| JP | 2004110286 A | 4/2004 | |
| JP | 2004110288 A * | 4/2004 | ............... G05D 1/02 |

(Continued)

*Primary Examiner* — Khoi H Tran
*Assistant Examiner* — Tanner L Cullen
(74) *Attorney, Agent, or Firm* — McDonnell Boehnen Hulbert & Berghoff LLP

(57) ABSTRACT

An automated guided vehicle control system includes an automated guided vehicle (AGV) transporting parts by moving along a guide line designed on a floor of a factory; and a server displaying a guide line map of the factory on a screen through an AGV path setting UI, setting a transport path of the AGV depending on selection of a node which is present in the guide line and AGV motion information considering a link direction between neighboring nodes included in the transport path and transmitting the set transport path and motion information to the AGV through a wireless relay.

3 Claims, 7 Drawing Sheets

(56) References Cited

U.S. PATENT DOCUMENTS

2020/0333789 A1* 10/2020 Suzuki .................... G01S 17/89

FOREIGN PATENT DOCUMENTS

| JP | 2004110288 | A | | 4/2004 | |
|----|------------|---|---|--------|---|
| KR | 100203499 | B1 | | 6/1999 | |
| KR | 20180063865 | A | * | 6/2018 | ............. G06Q 10/08 |
| KR | 1020180060283 | A | | 6/2018 | |
| KR | 1020180063865 | A | | 6/2018 | |
| WO | WO-2018168289 | A1 | * | 9/2018 | ............... G05D 1/02 |
| WO | WO-2019141225 | A1 | * | 7/2019 | ........... G05D 1/0289 |

* cited by examiner

FIG. 3
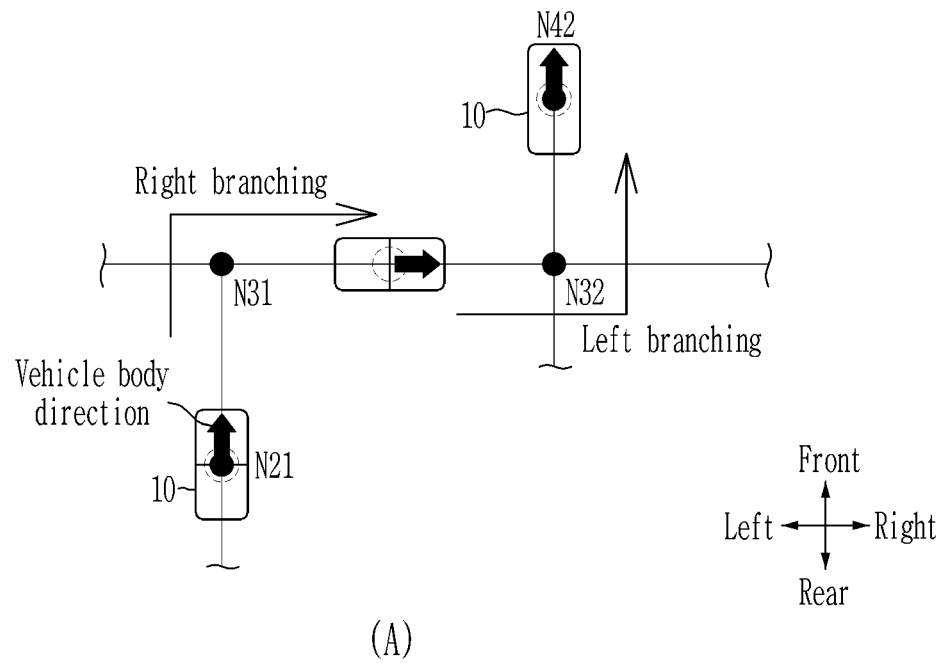
(A)
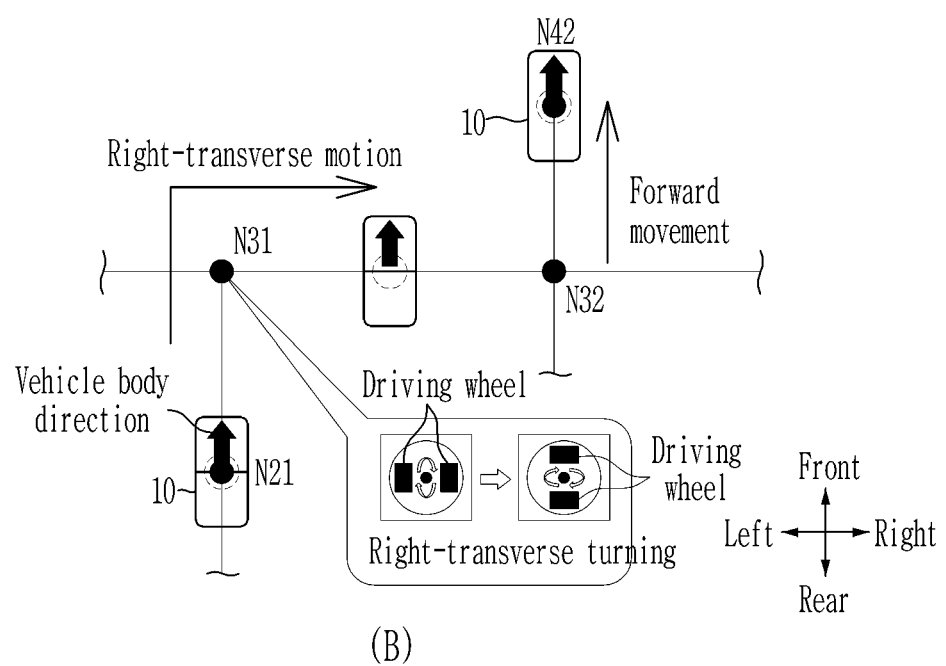
(B)

FIG. 6

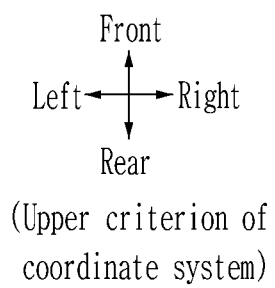

(Upper criterion of coordinate system)

<AGV motion automatic calculation basic table>

| Path direction | Motion information |
|---|---|
| ↑ | Forward movement |
| ↓ | Backward movement |
| ← | Left-transverse motion |
| → | Right-transverse motion |

(A)

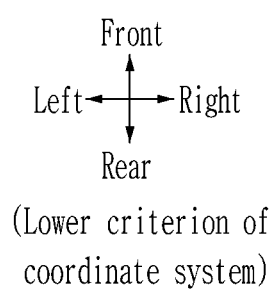

(Lower criterion of coordinate system)

<AGV motion automatic calculation basic table>

| Path direction | Motion information |
|---|---|
| ↑ | Backward movement |
| ↓ | Forward movement |
| ← | Right-transverse motion |
| → | Left-transverse motion |

(B)

AUTOMATED GUIDED VEHICLE CONTROL SYSTEM AND METHOD THEREOF

CROSS-REFERENCE TO RELATED APPLICATION

The present application claims priority to and the benefit of Korean Patent Application No. 10-2018-0157504 filed in the Korean Intellectual Property Office on Dec. 7, 2018, which is incorporated herein by reference in its entirety.

FIELD

The present disclosure relates to an automated guided vehicle control system and a method thereof, and more particularly, to an automated guided vehicle control system that automatically specifies path and operation information for controlling an automated guided vehicle operated in a factory and a method thereof.

BACKGROUND

The statements in this section merely provide background information related to the present disclosure and may not constitute prior art.

Generally, various parts are assembled in a production line of an automobile factory, and an automated guided vehicle (hereinafter, referred to as "AGV") is operated for flexibly and efficiently transporting parts. Particularly in an automated production process, interruption of parts supply during an operation has a great effect on line stoppage and yield, so it is very important to transport the parts in a right place at a right time.

The AGV carries goods at a starting point, runs along a guidance line, and moves to an end point (destination) via several intermediate nodes based on a specified path. Guidance of the AGV includes an electronic guide type, an optical guide scheme, or a magnetic guide scheme, but in an industrial site, a comparatively economic magnetic guide scheme is widely used.

In addition, in a factory, an AGV control system is provided to specify a path depending on a part transport schedule for each AGV.

Meanwhile, the AGV is evolved to various types by considering various environmental factors and working environments in the factory. For example, the AGV may be configured by various schemes including an integral type having a pallet on an upper surface, a low-lift type pulling a lower portion of a pallet with wheels, a forklift type capable of lifting the goods, a conveyor interlock type, and the like.

Since the AGV control system according to the AGV diversification is automatically controlled, a sequence control for a specific motion for each AGV type needs to be configured in addition to specifying the existing path.

However, in the AGV control system in the related art, the path may be specified only with respect to fixed movement within a predetermined range, and as a result, there is a problem in that there is a limit in setting the control of a motion sequence of the AGV.

Further, in general, the motion sequence of the AGV is set for each intermediate node on the path and an operation of setting the sequence control is very complicated by considering a type and a surrounding environment of the AGV one by one. Further, since an operator individually sets the motion sequence manually, there is a disadvantage in that a malfunction due to a human error may occur.

SUMMARY

The present disclosure provides an automated guided vehicle control system which automatizes setting of a transport path of an AGV for specifying a part transport operation in various AGV types and a changed factory environment and motion information for driving thereof and a method thereof.

One form of the present disclosure provides an automated guided vehicle control system including: an automated guided vehicle (AGV) transporting parts by moving along a guide line designed on a factory; and a server displaying a guide line map of the factory on a screen through an AGV path setting UI, setting a transport path of the AGV depending on selection of a node which is present in the guide line and AGV motion information considering a link direction between neighboring nodes included in the transport path and transmitting the set transport path and motion information to the AGV through a wireless relay.

Further, the AGV may include a node recognition module recognizing the node identity (ID) by counting a magnet of an S pole installed in the node, a wireless communication module transmitting the node ID to the server through the wireless relay and receiving a transport path reset in the server, a driving module generating traveling driving force by operating a motor with power of a battery, a memory storing at least one transport path set in the server, and a control module controlling the driving module by extracting motion information matching the recognized node ID.

In addition, the driving module may generate the traveling driving force in a progress direction and a speed depending on the motion information set for each node of the transport path.

Further, the driving module may include a motor 1 driving a driving wheel in a forward direction or a backward direction, and a motor 2 rotating the driving wheel and the motor 1 separated from a vehicle body in a left direction or a right direction for transverse turning.

In addition, the control module may apply an emergency stop signal to the driving module and display an alert and generate a stop event message and transmit the generated stop event message to the server when the driving module deviates from the transport path and the guide line is not recognized.

Further, the stop event message may include at least one of an AGV ID, a last recognized node ID, event state information, and an event time.

In addition, the server may include a communication unit transmitting the transport path and the motion information set in the AGV and receiving the node ID recognized by the AGV, a path setting unit calculates the transport path and the motion information from the starting point up to the end point on the guide line map by using the AGV path setting UI when a task for supplying the parts to the production line is allocated, a monitoring unit storing the transport path of the AGV being operated in the factory in a database DB and monitoring a movement situation based on the node ID received by each AGV, a display generating a guide line map image and a node layout coordinate system installed in the factory through the AGV path setting UI in graphics and augmenting and displaying movement and event situations of the AGV tracked by the monitoring unit in the graphics, and a control unit generating an event alarm and alerting the operator when an abnormal node is detected in which the node ID received by the AGV does not match the transport path.

Further, the path setting unit may select one AGV in an idle AGV list of the AGV path setting UI and set the transport path by receiving respective nodes corresponding to the starting point, the intermediate node, and the end point in order.

In addition, the path setting unit may classify nodes which are present in a rack area and a production line area of a warehouse on the guide line map as the starting point and the end point and classify the node as the starting point when the node is initially selected, and classify the node as the end point when an initially selected node is present.

Further, the path setting unit may generate motion information including a conditional statement based operation command for moving to a next node by considering an operation state of the AGV depending on previous motion information in each node which is present in the transport path.

In addition, the motion information may include at least one of a start or stop command at the starting point or the end point, a branch operation command of forward movement or backward movement or right branching or left branching, a speed setting command, a transverse turning command of a left-transverse motion or a right-transverse motion, an obstacle sensor operating area, a lifting control command, and a melody magnitude command for each node ID.

Further, the path setting unit may learn the transport path and the motion information set from a predetermined starting point up to a predetermined end point through the AGV path setting UI and store the learned transport path and motion information as a DB.

In addition, the path setting unit may extract at least one transport path stored in the DB with the starting point and the end point as an input condition and display the extracted transport path through the AGV path setting UI, and calculate and display motion information corresponding to at least one transport path selected among the transport paths.

Further, the path setting unit may change, when a coordinate system reference orientation of the guide line map is changed, all of operation commands of motion information of a subsequently generated transport path and the transport path and the motion information stored in the DB according to the changed reference orientation.

Meanwhile, another form of the present disclosure provides an AGV control method of a server, which controls an automated guided vehicle (AGV) operated in a factory, including: a) displaying a guide line map of the factory on a screen through an AGV path setting user interface (UI) when a task for supplying parts is allocated and setting a transport path by receiving respective nodes corresponding to a starting point, an intermediate node, and an end point of a specified AGV in order; b) setting AGV motion information considering a link direction between neighboring nodes included in the transport path; c) making the set transport path and motion information as a database and storing the transport path and motion information in the DB and transmitting the stored transport path and motion information to the AGV through wireless communication; and d) comparing, when a node ID recognized during an operation is received from the AGV, the received node ID with the transport path of the AGV and monitoring occurrence of an abnormal node according to whether the received node ID and the transport path match each other.

Further, the AGV control method may include: after step d), e) generating, when an abnormal node is detected in which the node ID does not match the transport path, an event alarm and gives an alert; and f) resetting the transport path and the motion information based on a node ID last received in the AGV and transmitting the reset transport path and motion information to the AGV.

In addition, step e) may include: determining, in the case where a next node ID is not received within a predetermined time after the node ID is last received in the AGV, the case as a stop event of the AGV and giving an alert.

In addition, step e) may include generating, when the AGV deviates from the transport path and a stop event message indicating that the AGV is urgently stopped is received from the AGV, an event alarm and giving an alert.

Further, step f) may include searching at least one candidate path through which the AGV is enabled to be transported with the node ID last received in the DB and the end point as an input condition and resetting motion information corresponding to a transport path selected among the searched candidate paths.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a conceptual view for describing a left/right branching scheme and a transverse turning scheme of an AGV in one form of the present disclosure.

Figure 4:
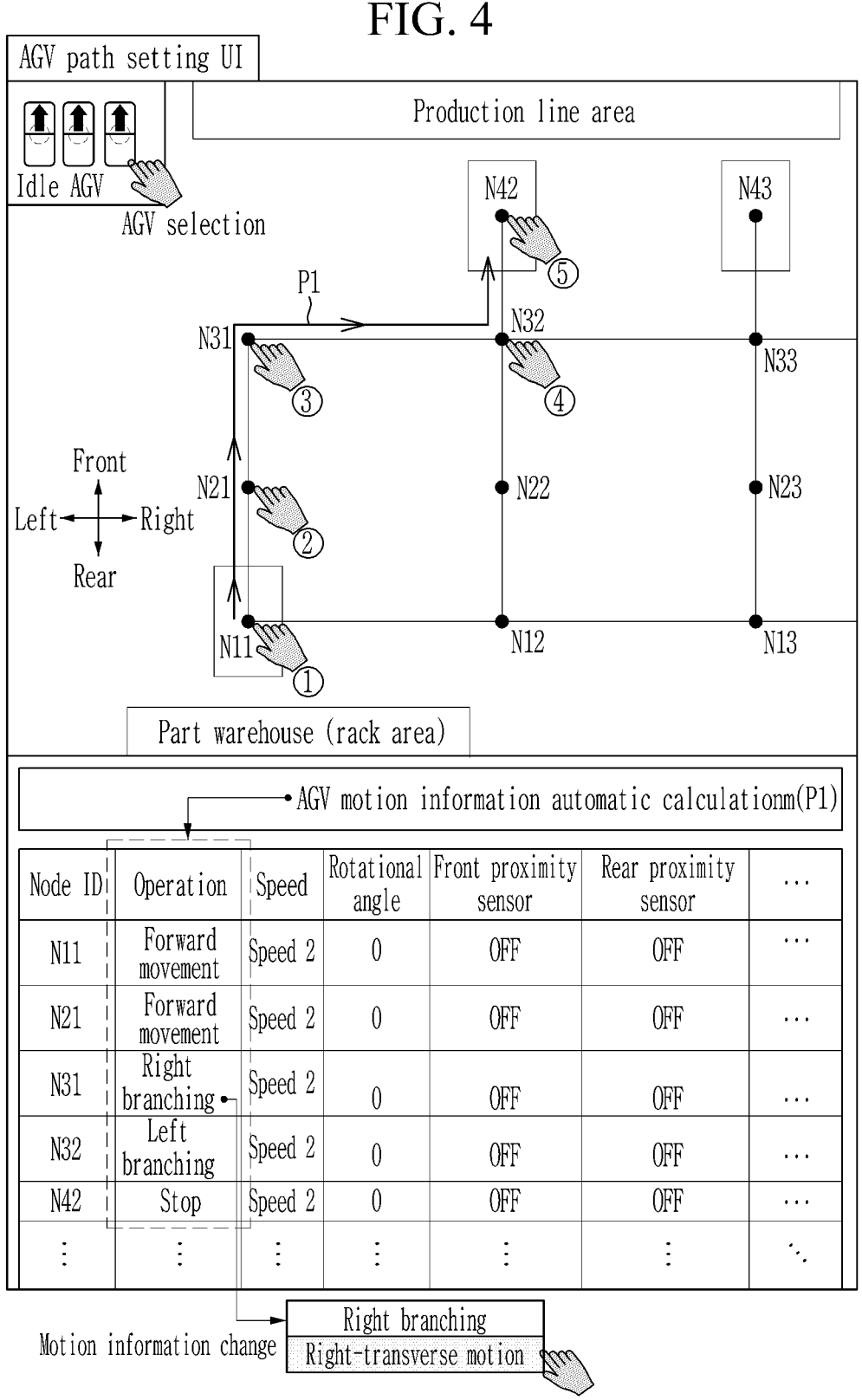

FIG. 4 schematically illustrates an AGV path setting UI in one form of the present disclosure.

Figure 5:
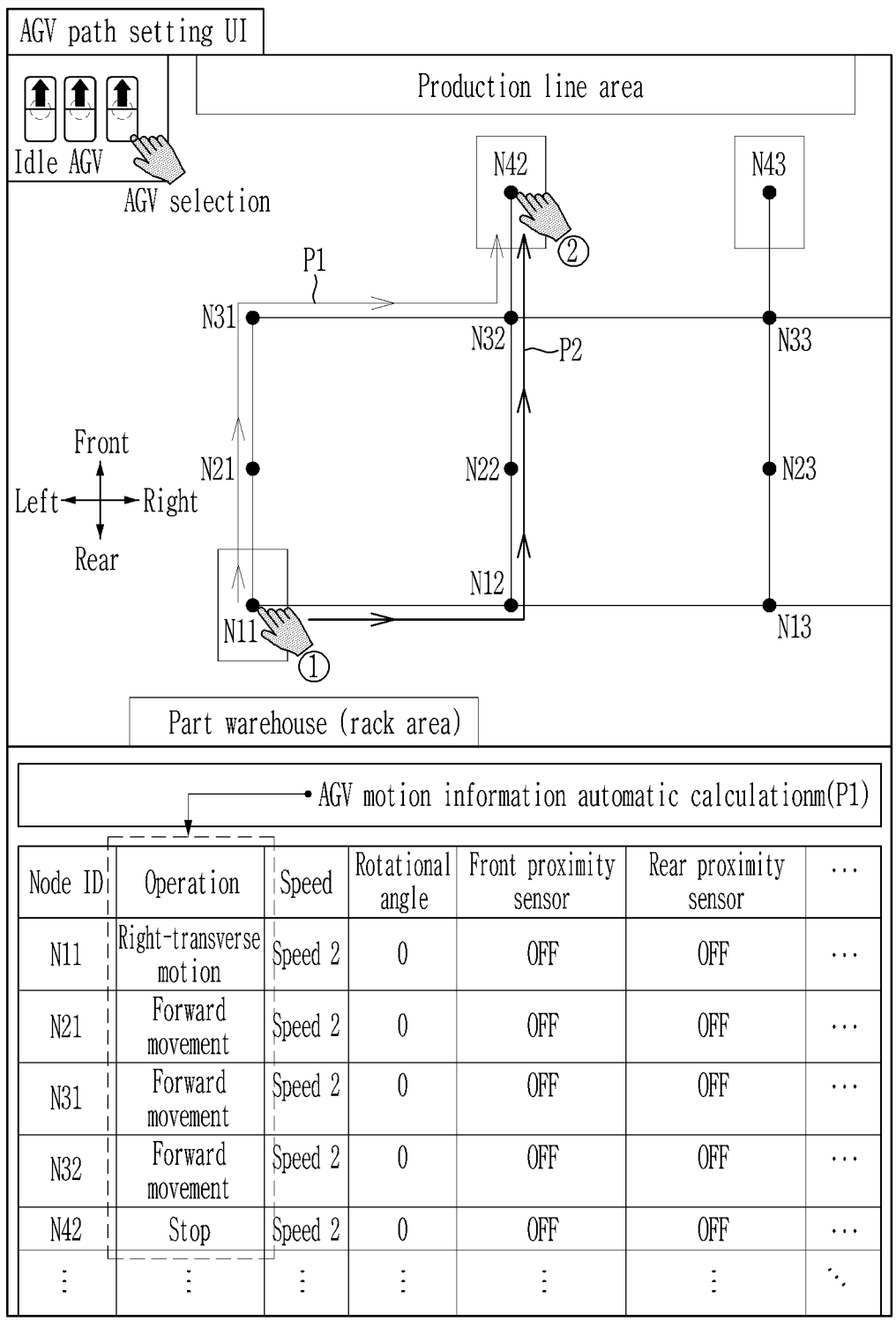

FIG. 5 illustrates a candidate path providing method through an AGV path setting UI in one form of the present disclosure.

FIG. 6 illustrates a variation state of a motion calculation table depending on a coordinate system setting reference of a guide line map in one form of the present disclosure.

Figure 7:
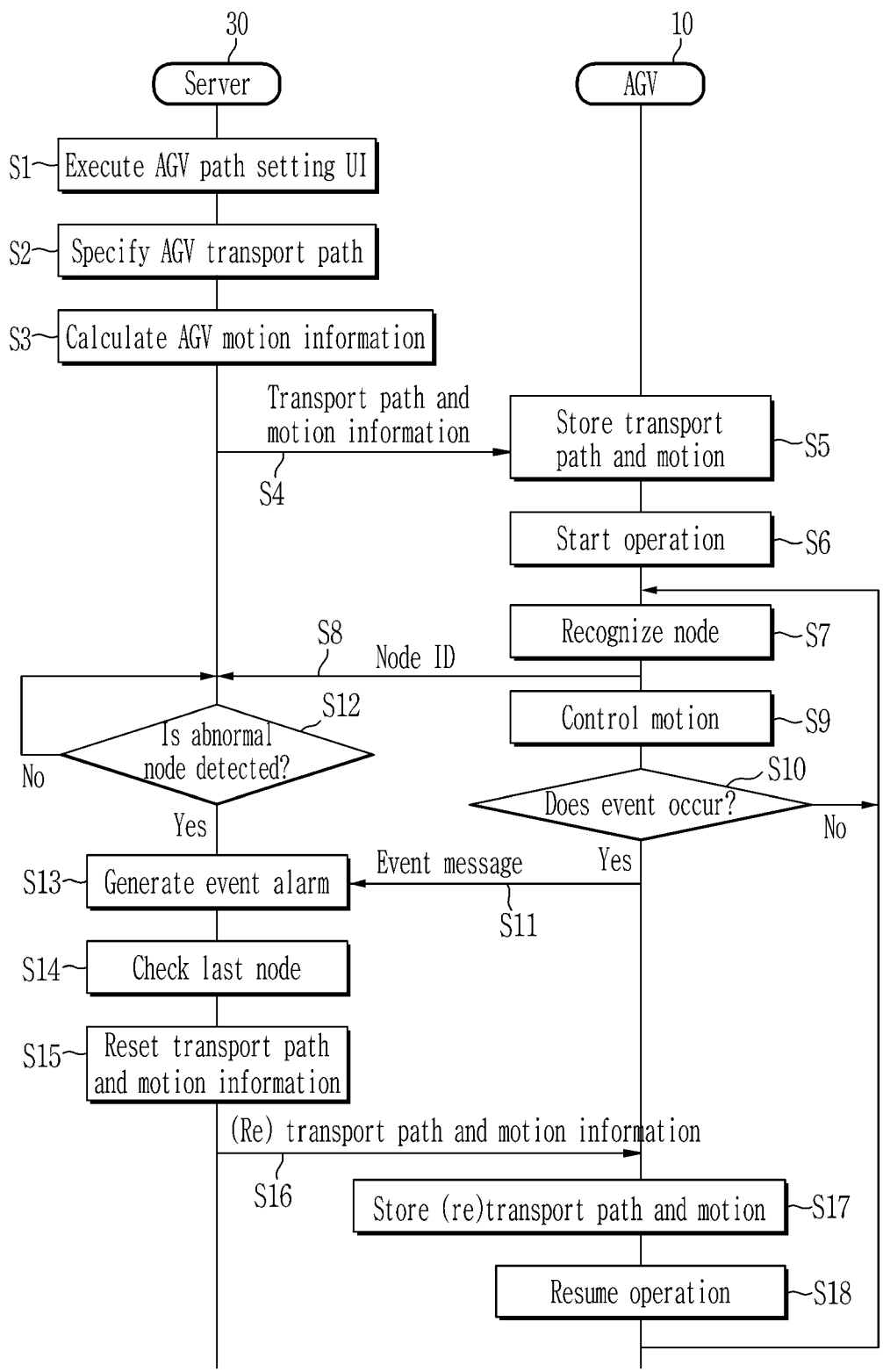

FIG. 7 is a flowchart schematically illustrating an automated guided vehicle control method in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, an automated guided vehicle control system and a method thereof in some forms of the present disclosure will be described in detail with reference to drawings.

Figure 1:
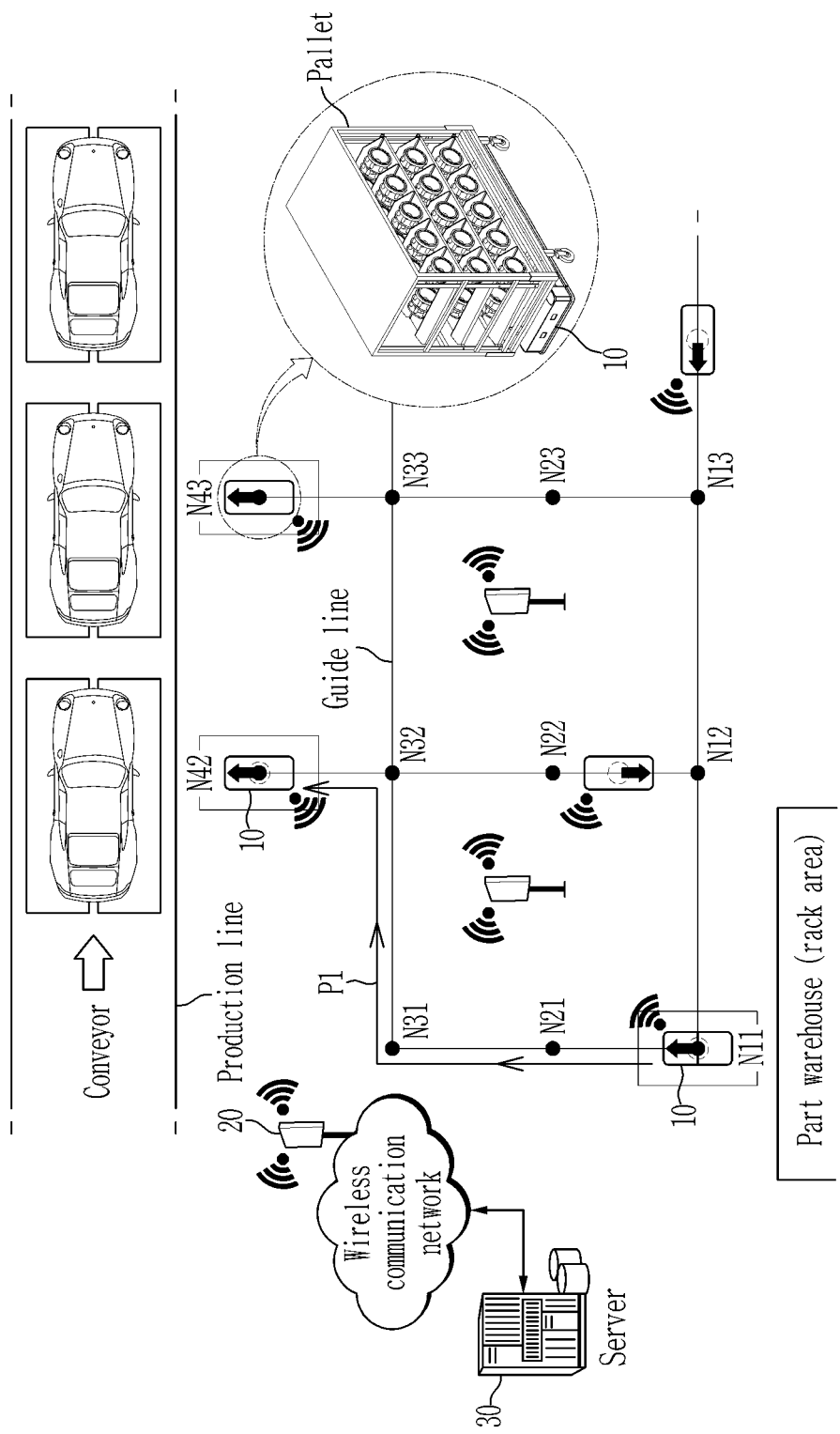
FIG. 1 is a network configuration diagram of an automated guided vehicle control system in one form of the present disclosure.

FIG. 1 is a network configuration diagram of an automated guided vehicle control system in some forms of the present disclosure.

Referring to FIG. 1, an automated guided vehicle control system in some forms of the present disclosure includes an automated guided vehicle 10, a wireless relay 20, and a server 30.

The AGV 10 serves to supply a part by moving to a process line specified according to a magnetic (N pole) guide line designed on a floor of a factory. A guide line forms a map in the form of a plurality of branches.

At each point such as a starting point, a connecting point, a branch point, an end point, and the like of the guide line, a node that may be recognized by the AGV 10 during movement is disposed. Thus, in an entire guide line map, a coordinate system is formed in which links multiple disposed nodes and neighboring nodes are connected. Hereinafter, the node is denoted by "N" and if necessary, a unique identification number (ID) is stipulated at the same time. The link refers to a unit section in which the node N and another neighboring node N are connected by the guide line.

For example, FIG. 1 illustrates a first path P1 in which the AGV 10 positioned in a rack area of a part warehouse carries parts and moves to node N42 in a production line area. The case of the first path P1 includes a link section in which the starting point is connected to N11, the connecting point is connected to N21, the branch point is connected to N31 and N32, and the end point is connected to node N42 by the guide line. Further, in the first path P1, motion information to be taken by the AGV 10 is set for traveling from each node to a next node.

Hereinafter, in some forms of the present disclosure, it is described that it is assumed that the AGV 10 is a low-lift type that pulls a lower portion of a pallet with wheels, but forms of the present disclosure are not limited thereto and the AGV 10 may be configured by various schemes including a forklift scheme, a mini-load scheme, a front hook pulling scheme, and the like.

A plurality of wireless relays 20 is disposed to form a wireless communication network and relays wireless communication between the AGV 10 and the server 30. For example, the wireless relay 20 may be configured by a wireless LAN (WiFi) and is not limited thereto and may adopt various wireless communication techniques including a single hop, a multi-hop, and the like.

The wireless relay 20 may transmit to the server 30 node recognition information ID received by the AGV 10 and transmit path information received by the server 30 to the specified AGV 10.

The server 30 is a control system that specifies a movement path of the part to the AGV 10 operated in the factory and controls a movement situation of the AGV 10 in real time.

The server 30 grants a part transport path of the AGV 10 so as to supply a part depending on a working state of the production line at the right place at the right time by interlocking with a manufacturing execution system (MES) (not illustrated) through an in-company network.

The server 30 displays on a screen the guide line map in which the AGV 10 is guided, specifies the transport path of the AGV 10 according to selection of the nodes disposed in the guide line, and automatically generates the motion information of the AGV 10 for each specified node.

Figure 2:
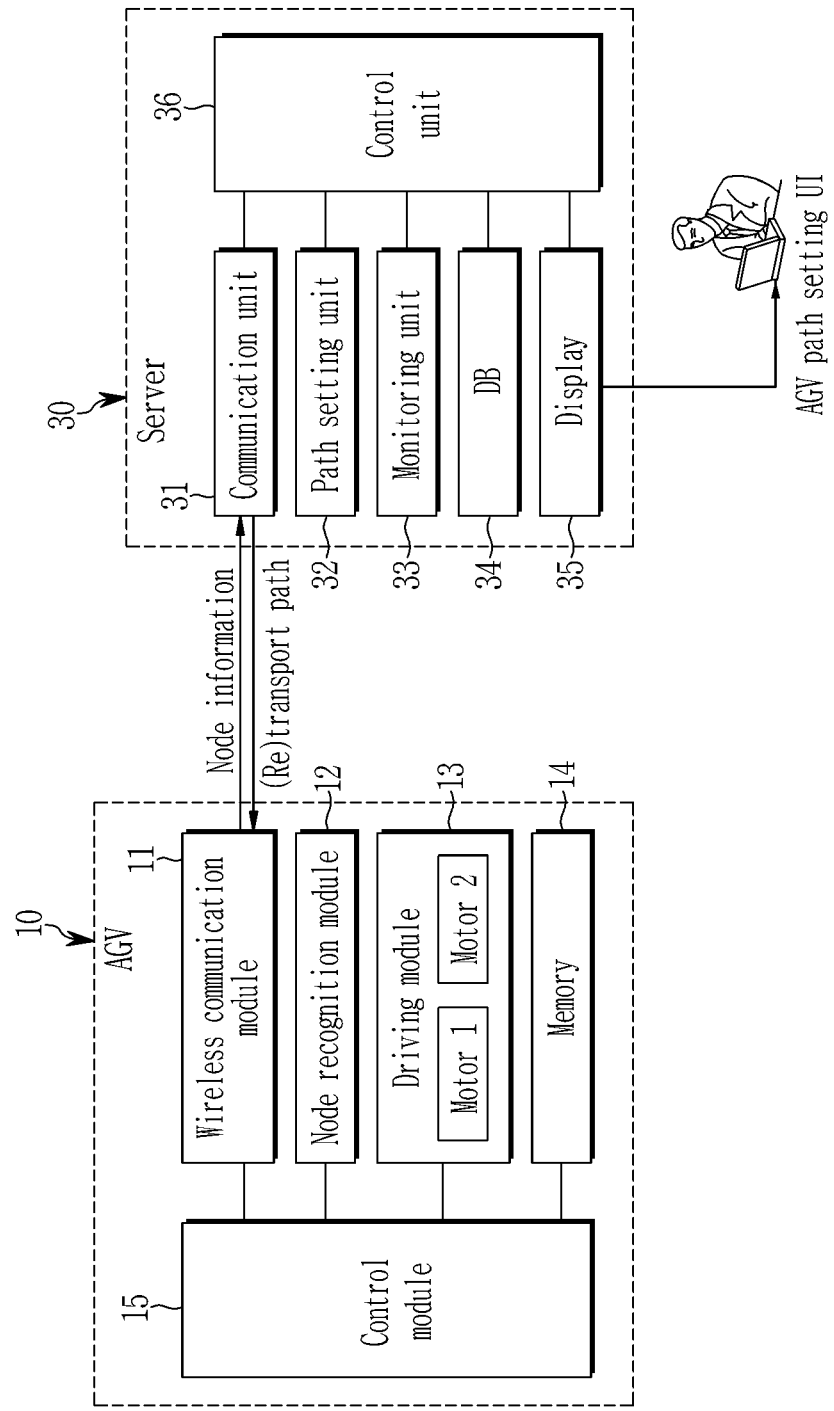
FIG. 2 is a block diagram schematically illustrating configurations of an AGV and a server in one form of the present disclosure.

FIG. 2 is a block diagram schematically illustrating configurations of an AGV and a server in some forms of the present disclosure.

Referring to FIG. 2, the AGV 10 includes a wireless communication module 11, a node recognition module 12, a driving module 13, a memory 14, and a control module 15. Besides, the AGV 10 may further include generally known components such as a guide line recognition sensor, a proximity sensor, a display, and a speaker.

The wireless communication module 11 transmits a node ID recognized during movement of the AGV 10 to the server 30 through the wireless relay 20.

Further, the wireless communication module 11 may receive the transport path and the motion information set in the server 30 through the wireless relay 20.

The node recognition module 12 recognizes an RFID installed in a node through which the AGV 10 passes while moving along the guide line or a node ID in a scheme of counting a magnet of an S pole. To this end, the node recognition module 12 may include at least one magnetic sensor and RFID detection means.

The driving module 13 operates a motor with power of a battery (not illustrated) to generate traveling driving force of the AGV 10.

The driving module 13 controls driving force in a progress direction and a speed of the AGV 10 depending on motion information (driving command) for each node included in the transport path.

The driving module 13 includes a motor 1 driving a driving wheel (not illustrated) of the AGV 10 in a forward direction or a backward direction and a motor 2 rotating the driving wheel separated from a vehicle body (body) and the motor 1 in a leftward direction or rightward direction for transverse turning. Here, the driving wheel is restrained to the vehicle body by a fixation pin which is operated forward and backward by a cylinder. The driving wheel is temporarily separated from the vehicle body by releasing the fixation pin before rotating the motor 2 and then, is restrained to the vehicle body again after rotation.

The rotation of the motor 2 is for the transverse turning of the AGV 10 as illustrated in FIG. 3 below.

FIG. 3 is a conceptual view for describing a left/right branching scheme and a transverse switching scheme of an AGV in some forms of the present disclosure.

First, FIG. 3A illustrates a left/right branching scheme, which is described by assuming that the AGV 10 is operated on a transport path from N21 to N42.

The driving module 13 drives the AGV 10 in a motion in which the AGV 10 moves forward at N21, branches right and then, moves forward at N31, branches left and moves forward at N32, and stops at N42 according to the motion information set to correspond to the transport path. In this case, the vehicle body (pallet) of the AGV 10 is continuously turned according to the progress direction of the transport path.

Further, FIG. 3B illustrates a transverse turning scheme, which is similarly described by assuming that the AGV 10 is operated on the transport path from N21 to N42.

The driving module 13 drives the AGV 10 in a motion in which the AGV 10 moves forward at N21, moves right in a transverse direction at N31, moves forward at N32, and stops N42 according to the motion information set to correspond to the transport path.

At N31, the driving module 13 may control a right-transverse motion of rotating only the driving wheel in a right direction through the motor 2 while the vehicle body of the AGV 10 faces forward and drives the driving wheel rotated in the right direction forward through the motor 1. Further, contrary to this, the driving module 13 may operate in a left-transverse motion of moving in the left direction by rotating only the driving wheel in the left direction while the vehicle body is left. As an easy example, the right-transverse and the left-transverse motions may be likened to moving crabs of tidal flats to the left and the right.

The memory 14 stores various programs and data for operating the AGV 10.

The memory 14 stores at least one AGV transport path set in the server 30 and motion information thereof.

For example, the AGV transport path may include a part supply path for supplying parts received from the warehouse to the production line, a part receiving path for moving the AGV from the production line to the warehouse for receiving the parts, and a charging path for moving to the AGV to a charging station for charging a battery.

The control module 15 may be constituted by at least one processor and circuit for controlling an overall operation of each of the modules of the AGV 10.

When a movement command of the AGV 10 is input, the control module 15 determines the specified transport path and initiates movement of the AGV 10 by controlling the driving module 13.

When the control module 15 recognizes an N-pole magnet of the guide line, and as a result, the node recognition module 12 recognizes the node ID while moving, the control module 15 transmits the recognized node ID to the server 30 through the wireless communication module 11. In this case, the transmitted node ID is used as monitoring information for tracking a movement situation of the AGV 10 in the server 30.

Further, the control module 15 extracts the motion information matched with the recognized node ID in the transport path to control the driving module 13. For example, in the case where the control module 15 moves on a first path P1 in FIG. 1, when N21 as a pass-through point is recognized, the control module 15 controls a forward motion, when N31 is recognized, the control module 15 controls a right-branching motion, when N32 is recognized, the control module 15 controls a left-branching motion, and when N42 is recognized, the control module 15 may control the driving module 13 in a stop motion.

Further, when the driving module 13 deviates from the guide line and the guide line is not recognized due to various reasons including a physical collision with the outside during movement, the control module 15 applies a stop signal to the driving module 13 and displays a warning and immediately generates a stop event message and transmits the generated stop event message to the server 30. The stop event message may include an AGV ID thereof, a last recognized node ID, and a lost motion (stop) and a stop time.

When the control module 15 receives the transport path and the motion information reset in the server 30 after transmitting the stop event message, the control module 15 updates a transport path and motion information which are set by default to the received information. In addition, the control module 15 resumes the operation with the reset transport path and motion information when the AGV 10 returns to the guide line.

Further, in the case of a state of charge (SoC) of the battery, when charging is required with low voltage which is less than a predetermined reference value, the control module 15 may generate a charge event message and transmit the generated charge event message to the server 30.

Meanwhile, in some forms of the present disclosure, the server 30 includes a communication unit 31, a path setting unit 32, a monitoring unit 33, a database (DB) 34, a display 35, and a control unit 36.

The communication unit 31 is connected to the AGV 10 which is being operated in the factory by wireless communication to transmit an optimal transport path and optimal motion information and receives the node ID recognized during movement of the AGV 10.

When a task for supplying the parts from an MES to the production line is allocated, the path setting unit 32 automatically generates the optimal transport path and motion information of the AGV by using an AGV path setting user interface (UI) displayed through the display 35.

Here, the optimal transport path does not simply mean a path in which the AGV 10 reaches a destination via a shortest node. This means automatically setting a safe path that eliminates a possibility of contact with surrounding obstacles/objects taking into account a movable area (space) according to a volume (size) of a mounted part. Further, the motion information means a conditional statement based operation command for moving to a next node by considering a state (e.g., a current vehicle body direction, a driving wheel direction, etc.) of the AGV depending on a previous motion in each node because the AGV 10 is the automated guided scheme.

Accordingly, in describing the related art, it is intended to solve a difficulty in setting a sequence control for specific motions of various AGVs, increase of complexity, and an error/operation error occurrence problem due to manual setting of a motion sequence.

FIG. 4 schematically illustrates an AGV path setting UI in some forms of the present disclosure.

Referring to FIG. 4, the path setting unit 32 shows a state of displaying the AGV path setting UI through the display 35 of a touch screen type.

The path setting unit 32 displays an idle AGV list and the guide line map in which the task may be input as charging is completed through the AGV path setting UI.

Hereinafter, a method in which the path setting unit 32 selects one AGV through the AGV path setting UI to automatically generate the transport path and the motion information will be described below.

The path setting unit 32 selects one AGV 10 touched by the operator in the idle AGV list.

The path setting unit 32 receives respective nodes corresponding to the starting point, the intermediate node, and the end point selected by the touch of the operator in the AGV path setting UI in order (1-2-3-4-5). In addition, the first path P1 is automatically calculated in which the path of N11 as the starting point is linked to N42 as the end point via the path of N21, N31, and N32 as the intermediate nodes. Here, the intermediate nodes mean a kind of pass-through point through which the AGV 10 needs to pass on the path up to the end point from the specified starting point.

In this case, the path setting unit 32 may classify and set the paths of the respective input nodes as follows.

First, the path setting unit 32 classifies nodes which are present in the rack area of the part warehouse and the production line area on the guide line map as the starting point or the end point.

When the node which is present in the rack area is initially selected without a previously selected node, the path setting unit 32 may classify the corresponding node as the starting point and set an operation start. Contrary to this, the path setting unit 32 may classify the initially selected starting point and a finally selected end point when the node in the rack area is selected while at least one intermediate node is selected and set an operation stop.

Further, the path setting unit 32 automatically calculates AGV motion information considering a link directionality between neighboring nodes by referring to the transport path of the AGV selected in the AGV path setting UI.

For example, examples of an AGV motion information setting list and a range thereof are as follows.

① Recognition node ID of AGV
② AGV operation scheme (stop/start)
③ Operation branch (forward movement/backward movement/right branching/left branching) of AGV
④ AGV speed (speed 1 to speed 5)
⑤ Transverse turning (left-transverse motion and right-transverse motion)
⑥ Obstacle sensor area
⑦ Lifting (up, down, none)
⑧ Melody (turning off melody, melody magnitudes 1 to 4), etc.

Here, the motion information considering the link directionality between the nodes may be automatically calculated as ② and ③ and in the case of the remaining information, a predetermined condition may also be calculated by default. In addition, when necessary, in the case of information calculated in each item, an operation option may be added or changed by an operator input.

In FIG. 4, for example, the path setting unit 32 may automatically calculate the AGV motion information considering the link direction between the neighboring nodes included in the first path P1 as follows.

N11 as the node positioned in the rack area is set to the forward movement because N11 is classified as the initially selected starting point and neighboring N21 is present in front of N11.

N21 is set to the right branching because N21 arrives in the forward movement from previously neighboring N11 and subsequent neighboring N31 is present at a right side.

N32 is set to the right branching because N32 arrives from previously neighboring N31 and subsequent neighboring N42 is present at a front side.

N42 as the node positioned in the production line area is classified as the end point and set to the stop because the initially selected starting point and at least one intermediate node are present.

When the calculated first path P1 and the motion information are transmitted to the selected AGV 10, the AGV 10 may be operated in a path of the same scheme as illustrated in FIG. 3A.

Further, the path setting unit 32 may change an operation option of N31 from 'right branching' to 'right-transverse motion' in the motion information automatically calculated through the AGV path setting UI and transmit the changed operation option to the AGV 10. In this case, the AGV 10 may be operated in a path of a transverse turning scheme as illustrated in FIG. 3B. Here, changing the right branching to the right-transverse motion does not simply mean only changing the option. This means that in the description of the AGV 10, the driving module 13 may automatically calculate in a command list of the AGV path setting UI a conditional statement based command for operation control of a step of separating the motor 1 and the driving wheel by releasing the fixation pin of the AGV 10 from the vehicle body, a step of rotating the motor 2 for transverse turning, a step of recoupling the fixation pin, and a step of driving the motor 1.

The path setting unit 32 learns the transport path and the motion information from a predetermined starting point up to a predetermined end point generated by such a process and stores the learned transport path and motion information as a DB. The path setting unit 32 may later automatically extract at least one candidate path that may be transported with the starting point and the end point as an input condition by using the learned information.

FIG. 5 illustrates a candidate path providing method through an AGV path setting UI in some forms of the present disclosure.

Referring to FIG. 5, the path setting unit 32 in some forms of the present disclosure extracts and provides the first path P1 and a second path P2 which are learned to a DB 34 when a starting point N11 and an end point N42 are input through the AGV path setting UI.

In this case, when the second path P2 is selected by the operator, the path setting unit 32 may automatically calculate the AGV motion information corresponding to the second path P2 of FIG. 5 and display the calculated AGV motion information through the AGV path setting UI.

Meanwhile, the path setting unit 32 may change a direction of an AGV motion automatic calculation table according to a change of a coordinate system setting criterion of the guide line map.

A criterion in which the path setting unit 32 calculates the motion information corresponding to the transport path of the AGV is based on a reference orientation of a coordinate system of the guide line map installed in the factory. Accordingly, when the reference orientation is changed, both motion information of the resulting generated transport path and motion information of the transport path stored in the DB 34 are changed.

For example, FIG. 6 illustrates a variation state of a motion calculation table depending on a coordinate system setting reference of a guide line map in some forms of the present disclosure.

Referring to FIG. 6A, when the coordinate system of the guide line map is set based on an upper direction, motion information for forward, backward, left, and right path directions may be set to forward movement, backward movement, the left-transverse motion, and the right-transverse motion.

In this case, as illustrated in FIG. 6B, when the coordinate system of the guide line map is changed at 180° in a lower direction, the coordinate system is changed so that the motion information for the forward, backward, left, and right path directions is set to the backward movement, the forward movement, the right-transverse motion, and the left-transverse motion.

Similarly, even when the coordinate system of the guide line map is changed at 90° in the right direction or the left direction, the coordinate system may be changed so that motion information of path directions corresponding thereto is set.

Accordingly, at the time of or even after constructing the AGV communication system, even though the reference direction of the coordinate system of the guide line map is changed for all environments in the factory and convenience of the operator, the motion information may not be individually calculated and changed, but may be automatically changed.

The monitoring unit 33 stores in the DB 34 the transport path and the motion information set in the AGV 10 being operated in the factory and monitors the movement situation based on the node ID received by each AGV 10.

The monitoring unit 33 may determine whether there is an abnormal node by comparing whether the node ID received from the AGV 10 is present in the set transport path and whether a reception (recognition) order of the node ID matches the set transport path.

When the transport path set in the AGV 10 does not match the received node ID, the monitoring unit 33 may determine that the corresponding node is the abnormal node and request path resetting to the path setting unit 32.

Further, when the node ID is not received within a predetermined time after the node ID is last received from the AGV 10, the monitoring unit 33 may generate the stop event of the corresponding AGV 10. In this case, the stop event is generated by a monitoring function of the AGV 10 by the server 30 apart from a stop event message generated by the AGV 10.

The DB 34 stores various programs and data for managing the path of the AGV 10 by the server 30 in some forms of the preset disclosure and stores information collected and generated according to the operation.

The display 35 is configured by a touch screen and provides an AGV path setting UI with various menus for the operator to set the transport path of the AGV 10 and monitor the movement situation of the AGV in real time.

The display 35 may generate a guide line map image and a node layout coordinate system installed in the factory through the AGV path setting UI in graphics and augment and display movement information and event situations of the AGV 10 tracked by the monitoring unit 33 thereon.

The control unit 36 controls an overall operation of each unit in order to control the AGV in some forms of the present disclosure.

The control unit 36 may execute a function of each unit by executing the program stored in the DB 34 and referring to data and may become a substantial control subject.

Accordingly, in describing an automated guided vehicle control method in some forms of the present disclosure to be described below, an operation (function) for each step processed by the server 30 is performed by the control unit 36, and as a result, the description of the operation (function) substitutes for the description.

FIG. 7 is a flowchart schematically illustrating an automated guided vehicle control method in some forms of the present disclosure.

Referring to FIG. 7, the server 30 in some forms of the present disclosure executes an AGV path setting user interface (UI) when a task for supplying parts to a production line is allocated from an MES (S1).

The server 30 sets a transport path by receiving respective nodes corresponding to a starting point, an intermediate node, and an end point of an AGV 10 selected by a touch by an operator in order through the AGV path setting UI in order (S2).

The server 30 automatically calculates motion information considering a link directionality between neighboring nodes by referring to the transport path set in the AGV 10 (S3). In this case, when the server 30 may change, delete, or add when necessary or set the automatically motion information as final motion information when the detailed option need not be changed.

The server 30 transmits the set transport path and motion information to the AGV 10 through wireless communication (S4). In this case, the server 30 stores the transport path and the motion information from a predetermined starting point up to a predetermined end point generated by such a process to be learned in the DB 34. The learned information may be later referred to extract at least one candidate path through which the parts may be transported with the starting point and the end point as input conditions.

The AGV 10 stores the transport path and the motion information received from the server 30 (S5) and starts an operation from the starting point (S6).

When the AGV 10 is guided to a magnetic guide line and a moving node is recognized (S7), the AGV 10 transmits a recognized node ID to the server 30 (S8).

The AGV 10 moves to a next node by performing motion control matching the node ID in the stored transport path (S9). Here, the motion control may include at least one of whether to switch a direction and a driving scheme of the AGV for moving from a current node to the next node.

When there is no special event during the operation (S10; No), the AGV 10 recognizes the next node and repeats the resulting motion control and stops when arriving at a destination.

On the contrary, when an event occurs in which the AGV 10 deviates from the guide line due to abnormality such as a physical collision with an obstacle during the operation and the guide line is not recognized, the AGV 10 may urgently stop (S10; Yes) and generate a related event message and transmit the generated related event message to the server 30 (S11).

Meanwhile, when the node ID recognized by the AGV 10 is received (S8), the server 30 compares the received node ID with the transport path set in the corresponding AGV 10 to determine whether the corresponding node is an abnormal node according to whether the received node ID matches the transport path (S12).

In this case, when the node ID does not match the transport path and the abnormal node is thus detected (S12: Yes), the server 30 generates an event alarm and alerts the operator (S13).

Besides, when the node ID is not received within a predetermined time after the node ID is last received from the AGV 10, the server 30 may generate a stop event of the corresponding AGV 10 and alert the generation of the stop event. Further, when the server 30 receives the event message from the AGV 10 (S11), the server 30 may generate the corresponding event alarm and alert the operator (S13).

The server 30 checks the node ID last received from the AGV 10 depending on the event generation (S14), resets the transport path and the motion information up to the end point based on the last node ID (S15), and transmits the reset transport path to the AGV 10 (S16).

In this case, the server 30 automatically extracts at least one candidate path through which the AGV 10 may be transported with the last node ID and the end point as the input condition in the DB 34 and provides the extracted candidate path through the AGV path setting UI. In addition, the transport path selected from the operator among the candidate paths and motion information corresponding thereto may be reset and transmitted to the AGV 10.

When the transport path and motion information reset by the server 30 are received, the AGV 10 stores the received transport path and motion information in a memory (S17) and displays a location of a restart node depending on the reset transport path through a display screen.

When the AGV 10 is transferred to the location of the restart node, the AGV 10 resumes the operation depending on the reset transport path (S18). Thereafter, the AGV 10 returns to step S7 to repeat the motion control depending on the node recognition up to arrival at a destination.

In the above description, it is described that the server 30 inquires the path information stored in the DB 34 with the starting point and the end point under the input condition only in the process of resetting the transport path and the motion information. However, some form of the present disclosure are not limited thereto and the method may further include a step of inquiring the path information stored in the DB 34 earlier before steps S2 and S3 of setting the path of a first AGV. That is, when the transport paths of the input starting point and end point conditions are not inquired in the learned DB 34, steps S2 and S3 may be performed.

As described above, in some forms of the present disclosure, a control server automatically calculates the transport path of the AGV depending on the node selection up to the starting point to the end point and the motion information corresponding thereto to efficiently perform various motion sequence control setting of various types of AGVs.

Further, the transport path and the motion information generated at the time of setting the path of the node specified in the AGV are stored as the DB and a search function of the path for each movement condition of the AGV is provided by using the transport path and the motion information, thereby rapidly setting the path and the motion information of the AGV without an error.

Further, a path depending on the generation of the event such as emergency stop, abnormal node operation, low-voltage alarm, is reset by monitoring an operation situation based on node information received by the AGV to rapidly cope with the generation of the event.

The forms of the present disclosure are not implemented only through the apparatus and/or method described above, but may be implemented through a program for implementing functions corresponding to the configuration of some forms of the present disclosure, a recording medium on which the program is recorded, and the like and some forms of the present disclosure can be easily implemented by those skilled in the art from the description of the forms described above.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An AGV control method of a server that is configured to control an automated guided vehicle (AGV) operated in a factory comprising:
   a) displaying a guide line map of the factory on a screen through an AGV path setting user interface (UI) when a task for supplying parts is allocated and setting a transport path by receiving respective nodes corresponding to a starting point, an intermediate point, and an end point of a specified AGV;
   b) setting AGV motion information based on a link direction between neighboring nodes included in the transport path;
   c) making the set transport path and motion information as a database (DB) and storing the transport path and the motion information in the DB and transmitting the stored transport path and the motion information to the AGV through a wireless communication;
   d) comparing, when a node identifier (ID) recognized during an operation is received from the AGV, the received node ID with the transport path of the AGV and monitoring occurrence of an abnormal node depending on whether the received node ID matches the transport path;
   e) when the abnormal node is detected, generating an event alarm by alerting the occurrence of the abnormal node; and
   f) resetting the transport path and the motion information based on a node ID last received in the AGV and transmitting the reset transport path and the motion information to the AGV,
   wherein the step e) comprises:
   when a next node ID is not received within a predetermined time after the node ID is last received in the AGV, alerting that a stop event of the AGV is occurred.

2. The AGV control method of claim 1, wherein the step e) comprises:
   when the AGV deviates from the transport path and a stop event message indicating that the AGV is urgently stopped is received from the AGV, generating the event alarm.

3. An AGV control method of a server that is configured to control an automated guided vehicle (AGV) operated in a factory comprising:
   a) displaying a guide line map of the factory on a screen through an AGV path setting user interface (UI) when a task for supplying parts is allocated and setting a transport path by receiving respective nodes corresponding to a starting point, an intermediate point, and an end point of a specified AGV;
   b) setting AGV motion information based on a link direction between neighboring nodes included in the transport path;
   c) making the set transport path and motion information as a database (DB) and storing the transport path and the motion information in the DB and transmitting the stored transport path and the motion information to the AGV through a wireless communication;
   d) comparing, when a node identifier (ID) recognized during an operation is received from the AGV, the received node ID with the transport path of the AGV and monitoring occurrence of an abnormal node depending on whether the received node ID matches the transport path;
   e) when the abnormal node is detected, generating an event alarm by alerting the occurrence of the abnormal node; and
   f) resetting the transport path and the motion information based on a node ID last received in the AGV and transmitting the reset transport path and the motion information to the AGV,
   wherein step f) comprises:
   searching at least one candidate path through which the AGV is transported with the node ID last received in the DB and the end point as an input condition; and
   resetting motion information corresponding to a transport path selected among the searched candidate paths.

* * * * *